United States Patent

Gudmundsson

[11] Patent Number: 5,941,096
[45] Date of Patent: Aug. 24, 1999

[54] METHOD OF OIL AND GAS TRANSPORTATION

[76] Inventor: Jon Steinar Gudmundsson, Alfheimsvingen 4, N-7026 Trondheim, Norway

[21] Appl. No.: 08/952,819
[22] PCT Filed: Jun. 7, 1996
[86] PCT No.: PCT/NO96/00137
  § 371 Date: Jan. 12, 1998
  § 102(e) Date: Jan. 12, 1998
[87] PCT Pub. No.: WO96/41096
  PCT Pub. Date: Dec. 19, 1996

[30] Foreign Application Priority Data

Jun. 7, 1995 [NO] Norway .................................. 952241

[51] Int. Cl.⁶ ....................................................... F25J 1/00
[52] U.S. Cl. .............................................. 62/633; 62/54.1
[58] Field of Search ............................... 62/54.1, 240, 633

[56] References Cited

U.S. PATENT DOCUMENTS

| 3,386,257 | 6/1968 | Beazer | 62/240 |
| 3,864,927 | 2/1975 | Li | 62/240 |
| 3,975,167 | 8/1976 | Nierman | 62/240 |
| 4,341,078 | 7/1982 | Weitzen | 62/54.1 |

Primary Examiner—Ronald Capossela
Attorney, Agent, or Firm—Dennison, Meserole, Scheiner & Schultz

[57] ABSTRACT

A method for transportation and storage of a natural gas-containing product from a production site for the product. The product is separated into an oil phase and a gas phase and the gas phase is converted to a gas hydrate from which residual water is separated. The oil phase is then dehydrated and mixed with the gas hydrate to form a slurry which is stable through storage and transport.

11 Claims, 2 Drawing Sheets

METHOD OF OIL AND GAS TRANSPORTATION

BACKGROUND OF THE INVENTION

The invention concerns a method for transportation and storage of gas and oil, or gas and condensate.

In cases where pipelines for transportation of gas are absent, it is difficult to perform efficient exploitation of the gas. The gas can not be combusted continuously, it can not be used on the spot, for example on a platform offshore, and can not be carried to the consumer through a pipeline.

One possibility in such cases is re-injection of valuable gas back into the reservoir. Exploitation of single isolated gas fields, e.g., offshore, is economically without using the gas on the spot or transporting it through a pipeline. It has also been suggested to treat the gas on the spot in the production of liquefied natural gas such as, methanol and ammonia. The three latter alternatives, however, require comprehensive treatment of the gas and/or another gas product, and require complex equipment, in a scale which is unsuited for working offshore.

In an effort to solve problems of this type it has been suggested to produce gas hydrates. Gas hydrates form extremely structured systems, in which all water is bonded in an open crystal structure ("empty hydrate") through hydrogen bonds, wherein the hydrate has a density less than ice. The open nature of the crystal structure means, gas molecules can become immobilized and captured in the lattice cavities without breaking the hydrogen bonds. All hydrogen atoms (except for a few surface atoms) are involved in hydrogen bonds, and the gas molecules cooperate with the water molecules through van der Waals forces (non-polar). In this way the hydrate is a phase enabling polar bonding between water molecules and non-polar interaction between foreign molecules. For example, hydrates formed from on cubic meter of water may bond about 150–170 m$^3$ methane. This fact has opened new possibilities for transportation and storage of hydrate forming gases.

For general examples of prior art from the patent literature within this technical field, we refer to U.S. Pat. No. 3,888, 434 and NO Patent 149976. However, both concepts require use of high pressure to realize transportation over longer distances in order to avoid dissociation of gas and water from the hydrates.

NO Patent 172808 describes a method for production of gas hydrates in a gas phase reactor to facilitate transportation and storage of hydrate forming gases. NO Patent Application 944974 (published after the filing date of the present application), describes an alternative method for transportation of gas hydrate. Hydrate forming gases and water are supplied to a pressurized liquid phase reactor to form gas hydrate. In order to absorb the heat evolved from the exothermal hydrate-forming reaction, the reactor is supplied with a combined cooling and reactant medium comprising a slurry of ice crystals in a liquid carrier such as water or condensate of light hydrocarbon fractions. In the reactor, the ice crystals melt at least partially and absorb reaction heat from the exothermal hydrate forming reaction between gas and water, whereupon water and the carrier liquid are separated from the hydrate in a subsequent separation step. Gas hydrates produced in accordance with the two latter patent publications enable separate transportation of gas at or close to atmospheric pressure and at substantially adiabatic conditions at temperatures below 0° C. A transportation of this type has evident advantages compared to transportation of LNG, for example, in longer distances and with hydrate processes found in the prior art.

For small oil fields, such as in the North Sea, with a low production rate and short lifetime, it is economically impossible to perform any exploitation since any oil exploitation also requires handling of the natural gas. With the prior art technology the transportation of oil and gas must occur separately, where the gas is treated and transported as LNG, as liquid products such as methanol or other chemical products, or as gas hydrates. This transportation requires separate storage and transportation units, and will, as mentioned above, render exploitation economically unattractive. On the other hand, the gas may be burned, or re-injected back to the reservoir, but then the economic potential of the natural gas will be lost.

Moreover, there are fields located at long distances from the terminal that require long distance transportation by tanker. In some cases one must resort to long distance pipeline transportation of the oil, either alone or in combination with gas in a two-phase flow, and in many cases the gas will be re-injected back to the reservoir. In such cases it is usually economically unattractive to perform any gas treatment to produce gas hydrate since there is no real transportation possibility for the gas hydrate. On the other hand, two-phase transportation of gas and oil requires high pressures and accordingly increased costs, whereas re-injection of gas back to the reservoir will forfeit a valuable resource.

SUMMARY OF THE INVENTION

An object of the present invention is to provide a novel method for transportation or storage of oil/condensate and gas.

A particular object of the invention is to provide a method enabling long distance transportation of oil and gas, particularly pipeline transportation, and exploitation of small oil fields which today are considered to be un-exploitable.

In one aspect, the invention concerns a method for transportation and storage of gas and oil, such as natural gas and crude oil from the production site to a remote terminal, or for example unloading of gas hydrate from a tanker at the terminal where the gas hydrate has been transported as a solid phase. The term 'condensate' means light hydrocarbon fractions from e.g. gas fields, generally having 4 carbon atoms or more per molecule, but more specifically hydrocarbons having 4 to 10 carbon atoms per molecule.

In one embodiment of the invention, the gas is converted to gas hydrate in a manner known per se by combining hydrate-forming gas and water in a pressurized reactor of gas phase or liquid phase type, and then, separating the hydrate from water, drying and cooling the hydrate, preferably to a temperature of minus 10° C., e.g., as described in the above mentioned NO Patent 172080 and NO Patent Application 944974, respectively. In order to facilitate the subsequent mixing step, the hydrates are preferably comminuted, such as by crushing.

In accordance with the invention, the oil phase is, in general, cooled and mixed with the gas hydrates to produce a substantially homogenous slurry of hydrate in oil, whereupon the resulting slurry can be transported or stored in the same unit at a pressure near atmospheric at a temperature of below 0° C., preferably below minus 15° C., or at higher pressures and temperatures in cases where the slurry is to be pumped for long distances.

In this way, the transportation and storage of oil and gas can occur at substantially atmospheric pressure in the form of a solids/liquid composition by using the same transportation unit or using pipeline transportation of oil and gas in the form of a liquid/solids composition at moderate pressure and temperature conditions. Accordingly, the present invention makes it both technically and economically possible for example to exploitate gas and oil from small or remote production fields which have otherwise been un-exploitatable. The invention is particularly suited for transportation of oil and gas in the form of a slurry by shuttle tankers from floating production units, but pipeline transportation is also possible.

According to the present method, the mixing is preferably performed at a temperature and pressure where the gas hydrates are stable, thus avoiding decomposition of hydrate and liberation of water to the resulting composition, which may cause problems later like coating formation and/or pump and pipe clogging because of freezing of the water phase if the transportation occurs at a temperature below the freezing point of water. At atmospheric pressure, it is preferred to keep both the oil phase and the gas hydrate at a temperature below minus 10° C. prior to mixing, but temperatures up to 0° C. may be used. Mixing of hydrate into the oil phase can be performed in any suitable manner, such as by feeding hydrate into a continuous flow of oil in a pipeline, or by mixing in a container with a stirrer.

The mass ratio between hydrate and oil is not critical, but with respect to the pumpability of the slurry, the practical upper limit of the hydrate portion in the slurry can be said to be 50 percent by volume since an increasing portion of hydrate in the slurry will increase the viscosity. The hydrate portion in the slurry will in practice be determined by the gas/oil ratio in the product flow.

Moreover, in view of possible ice formation during transportation or storage of the slurry at temperatures below the freezing point of water, as described above, it is advantageous to separate any water present in the oil phase from the latter prior to mixing of the oil and hydrate. De-emulgators can be added to the resulting composition to avoid formation of W/O emulsions and freezing of the same.

Whereas oil, condensate and hydrate in general exhibit the same heat capacity, the thermal conductivity of the oil phase and the condensate phase is lower than for the hydrates and constitutes only about 30% of the heat conductivity of the hydrate. By evaluating heat loss alone from hydrate during transportation or storage, it will be more favourable from a thermodynamical point of view to store/transport the hydrate in a mixture with oil or condensate.

However, during storage or transportation of a stationary (i.e. non-flowing) slurry, hydrate may precipitate at the bottom of a tanker because hydrate particles in general have a higher density than the oil phase. In such cases it may be required to perform re-mixing of the slurry to facilitate any pumping and separation at the terminal. Such sedimentation or precipitation of hydrate in the oil phase can be reduced by using hydrate with a small particle size, since the sedimentation rate for the particles decrease with decreasing particle size. Another alternative is reducing the temperature in the oil phase to render it more viscous, whereupon the sedimentation rate for hydrate particles is further decreased. It is also possible to use foaming agents in combination with dispersed gas, preferably natural gas in view of the gas quality, in the oil phase, to adhere to the hydrate particles and keep them floating in the slurry.

Storage and transportation occur close to adiabatic conditions preferably at a pressure near atmospheric, and the temperature must be 0° C. or below. For transportation in shuttle tankers for example, the tanker should be provided with properly insulated containers to reduce heat transfer to the cargo.

At the terminal, the slurry is preferably pressurized by means of pumps or similar to avoid compression of natural gas after separation. Then, the slurry is heated to melt the hydrate and produce the as. The gas is collected and handled/treated with respect to the particular demand, whereas the liquid phase is separated in an oil phase and a water phase. The resulting water phase is preferably used again in the production of gas hydrates, and in transportation on a ship from the production site offshore, the tanks can be loaded with water for transportation back to the production site for another load of slurry, whereupon the water is unloaded and used again in the hydrate production.

The invention is also applicable to unloading of tankers with solid gas hydrate, in which the hydrate tanks aboard are filled with oil or condensate having a temperature below 0° C. to form a slurry of hydrate in liquid oil or condensate in the tank. The unloading of hydrate in a continuous liquid phase from the tank aboard to the terminal can be performed with pumps which are commonly used for slurry pumping since the continuous phase in the slurry is kept at a temperature where the hydrates are stable but flowing and pumpable. Another advantage with the present invention is that the slurry, and the encompassed gas, can be compressed to an increased pressure with a moderate energy requirement before the separation step of separating oil/condensate and decomposition of gas hydrate to water and gas. The gas can in this way be pre-compressed to 20 bars, for example, at a low operation cost. Calculations have shown that the operation costs connected with unloading and separation by means of a slurry can be decreased to ⅓ of the costs connected with unloading and separation of solid gas hydrate.

DESCRIPTION OF THE PREFERRED EMBODIMENTS

EXAMPLE 1

Figure 1:
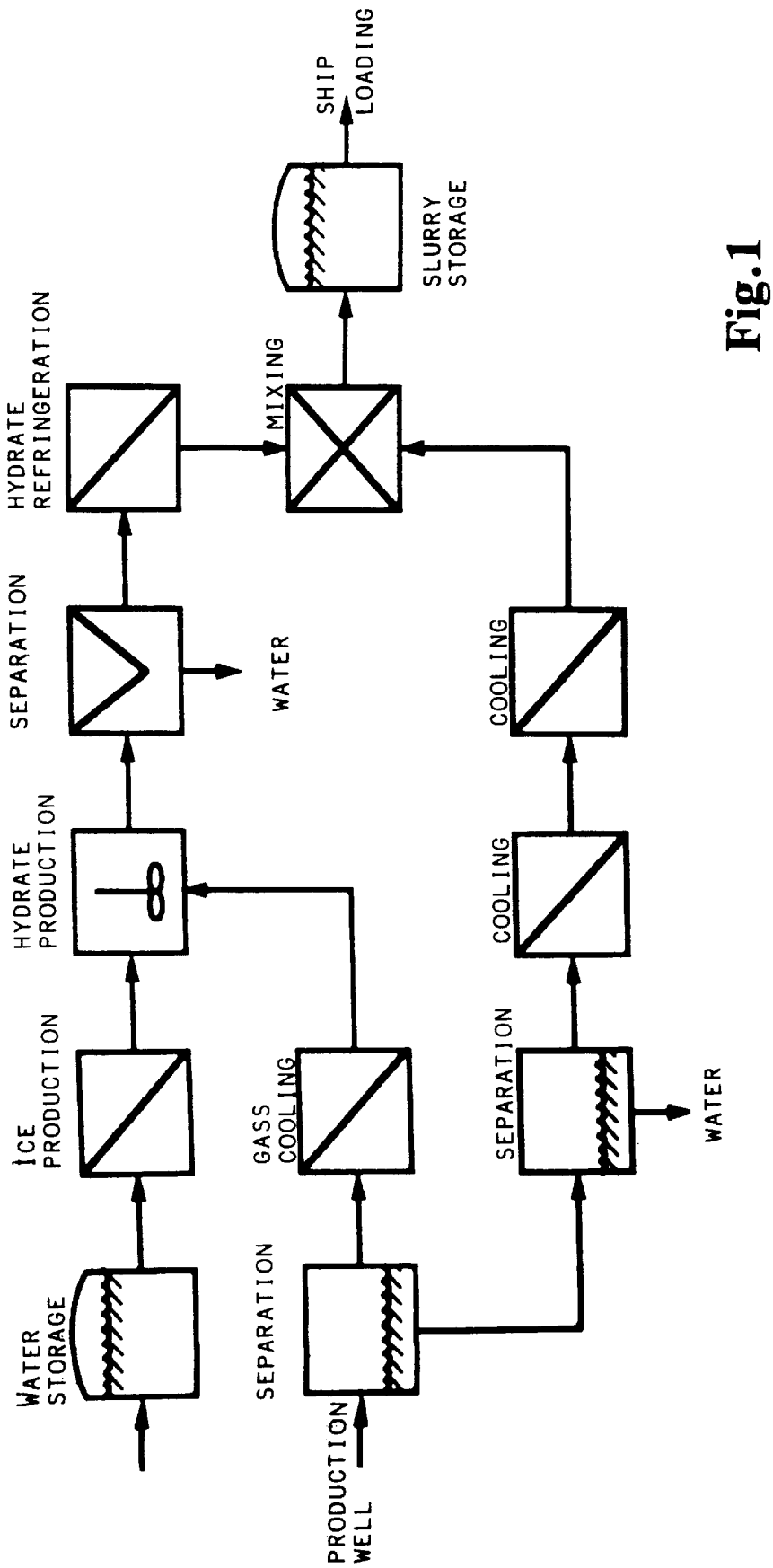
FIG. 1 illustrates a strongly simplified process flow sheet for the production of slurry at a floating production unit.
Figure 2:
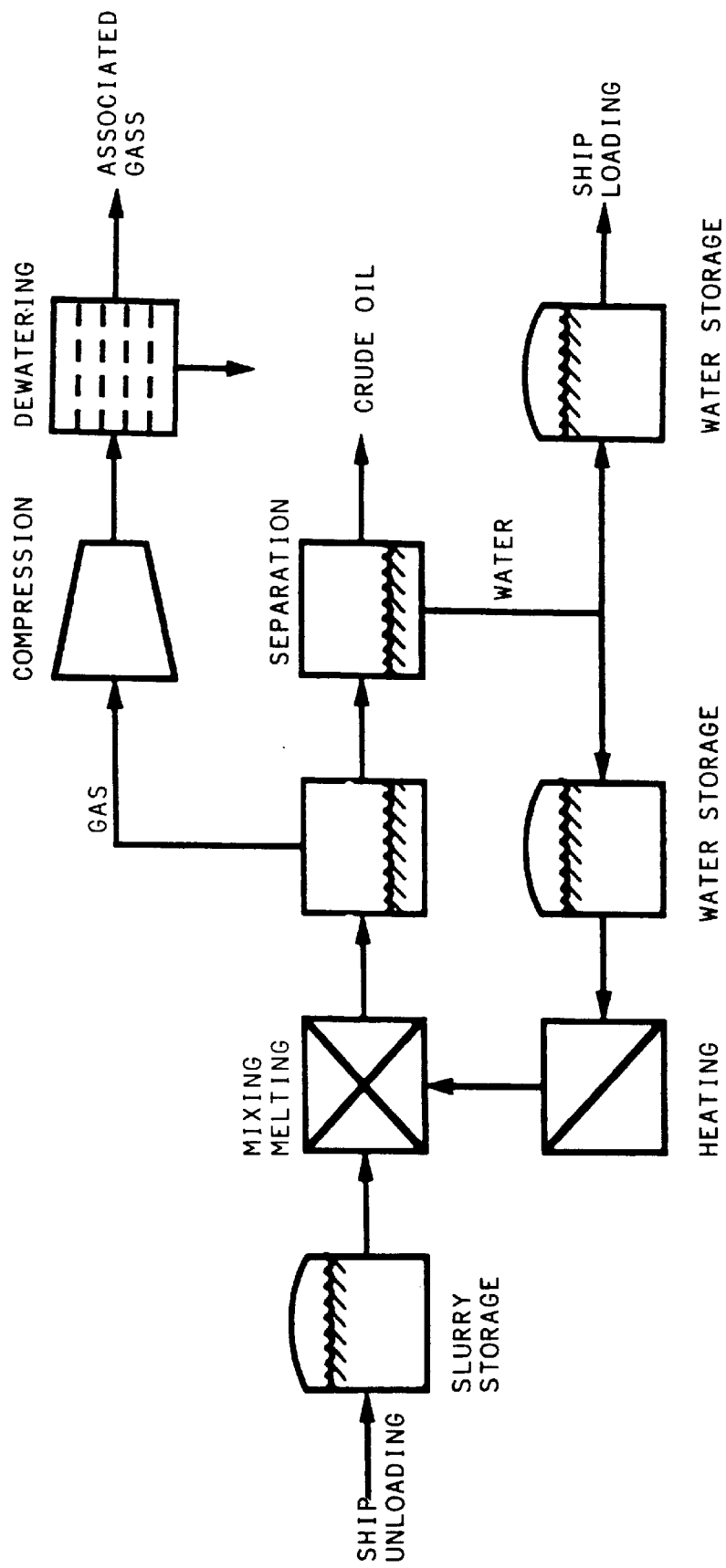
FIG. 2 illustrates a strongly simplified process flow sheet for the separation of slurry at a terminal onshore.

The present example is provided in order to illustrate the process for the preparation of a slurry comprising oil and gas hydrate produced at a floating production unit offshore, including separation at a terminal, with reference to FIGS. 1 and 2.

According to FIG. 1, fresh water, preferably return cargo in the form of separated water from the terminal onshore, is supplied to a production step for the production of an ice slurry. Simultaneously, the product flow from the oil well is separated into a gas phase and an oil phase.

The gas phase having a pressure of about 25 bar, is refrigerated and compressed to about 55 bar, and is then supplied to a hydrate reactor in the liquid phase type together with the produced ice slurry for the production of gas hydrate at a pressure of about 50 bar and a temperature of about +10° C. The resulting hydrate is then conveyed to a separation unit to remove water, and to a refrigeration unit to refrigerate the hydrate, preferably to minus 10° C., followed by pressure relief to about 1 bar.

The oil phase is conveyed to a separation unit to remove water, and then to at least one refrigeration unit, e.g., with a first heat exchanger cooled by seawater and then to a propane unit, to bring the oil phase down to a temperature of minus 10° C. or below. However, the temperature of the oil phase should not be decreased to a level at which the resulting viscosity becomes high, as this creates difficult hadling characteristics.

The resulting oil phase and the refrigerated hydrate at about atmospheric pressure are conveyed to a mixing unit, for example a container provided with a stirrer operated at about atmospheric pressure, to form a slurry of natural gas hydrate in oil.

The resulting slurry of hydrate in oil is pumped to a transport ship or stored at the production site at about atmospheric pressure and at a temperature of about 0° C. or below, preferably at minus 10° C., and at substantially adiabatic conditions.

At the terminal (FIG. 2), the hydrate slurry is conveyed to a storage tank and then to a melting unit, where the hydrate is melted by mixing with heated water recycled from the subsequent separation. The resulting gas fraction is then compressed, if required, sent to a water removal unit and then to other processes or storage units. As mentioned above, it is preferred to perform compression of the slurry by pumps to a higher pressure to decrease or even eliminate the compression of the separated gas phase by compressors. The liquid fraction is then conveyed to a further separation unit where the fraction is separated into a water phase and an oil phase. The water phase is divided into a recycle flow, which is heated and conveyed back to the melting unit, and a waste water flow conveyed to a storage tank and back to the transport ship for use again in the hydrate production on the floating production unit.

EXAMPLE 2

We have performed a rough economic evaluation of three alternative modes for handling the gas fraction from a production well: 1) Buraaning the gas on the spot, 2) Re-injection of superfluous gas back to the reservoir, and 3) Production of an oil/hydrate slurry according to the present invention. All alternatives are based upon exploitation and collection of the oil fraction.

The production well is assumed to exhibit exploitable reserves of 5–10 Megtons, a lifetime of 3–5 years and a reservoir pressure of about 250 bar. Moreover, a production rate of 5100 tons oil/day and 756 tons gas/day was estimated. With regard to alternative 3 above, i.e. the alternative according to the present invention, the investments connected with transportation and handling at the terminal end have also been included.

TABLE 1

| Investment costs of the different alternatives (billion NOK) | | | |
| --- | --- | --- | --- |
|  | Alt. 1 | Alt. 2 | Alt 3 |
| Oil exploitation | 4.000 | 4.000 | 4.000 |
| Increase for the alternative | — | 0.227 | 0.499 |
| Total | 4.000 | 4.227 | 4.499 |

The difference between the investment costs of Alternative 2 and 3 above are estimated to amount to 272 million (NOK). Considering a market value of 0.50–0.70 NOK/Sm$^3$, the additional investment costs can be paid within 1.9 to 1.3 years, respectively.

Accordingly, the present invention describes a method for storage and transportation of gas and oil which makes it technically and economically possible to perform exploitation of even remote small oil fields without any pipeline facilities.

What is claimed is:

1. A method for treating a natural gas-containing product at a production site therefor to form a storable and transportable slurry, comprising the steps of:

a) separating a product from the production site into an oil phase and a gas phase;

b) converting the gas phase to a gas hydrate and separating residual water therefrom; and c) dehydrating the oil phase and mixing the dehydrated oil phase with the gas hydrate from which residual water has been separated to form the slurry.

2. The method of claim 1, additionally comprising placing the slurry into storage.

3. The method of claim 1, additionally comprising transporting the slurry to a remote site.

4. The method of claim 3, additionally comprising heating the slurry at the remote site to melt the gas hydrate and separate the natural gas therefrom.

5. The method of claim 4, additionally comprising separating water from the melted gas hydrate, and recycling the water to convert gas phase to gas hydrate.

6. The method of claim 1, wherein the oil phase comprises a light hydrocarbon condensate from the gas phase.

7. The method of claim 1, wherein the gas hydrate is comminuted prior to or during mixing with the dehydrated oil phase.

8. The method of claim 7, wherein the temperature is about −5° to −10° C.

9. The method of claim 1, wherein said mixing is performed at a pressure of about 1 atmosphere at a temperature of less than about 0° C.

10. The method of claim 1, wherein the gas hydrate is formed by combining the gas phase and water in a pressurized reactor.

11. The method of claim 1, wherein the gas hydrate is formed by cooling and compressing the gas phase and mixing with an ice slurry in a pressurized reactor.

* * * * *